United States Patent
Lo et al.

(10) Patent No.: US 12,079,306 B2
(45) Date of Patent: Sep. 3, 2024

(54) METHODS AND APPARATUSES OF CONTRASTIVE LEARNING FOR COLOR CONSTANCY

(71) Applicant: MEDIATEK INC., Hsinchu (TW)

(72) Inventors: Yi-Chen Lo, Hsinchu (TW); Chia-Che Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 469 days.

(21) Appl. No.: 17/529,539

(22) Filed: Nov. 18, 2021

(65) Prior Publication Data

US 2022/0164601 A1 May 26, 2022

Related U.S. Application Data

(60) Provisional application No. 63/116,377, filed on Nov. 20, 2020.

(51) Int. Cl.
G06T 7/90 (2017.01)
G06F 18/214 (2023.01)
(Continued)

(52) U.S. Cl.
CPC ............ *G06F 18/214* (2023.01); *G06F 18/22* (2023.01); *G06N 20/00* (2019.01); *G06T 7/90* (2017.01);
(Continued)

(58) Field of Classification Search
CPC ...... G06F 18/214; G06F 18/22; G06F 18/241; G06F 18/2415; G06N 20/00; G06N 3/084;
(Continued)

(56) References Cited

U.S. PATENT DOCUMENTS 5,771,311 A * 6/1998 Arai .................... H04N 1/6086
358/518
10,939,742 B2  3/2021 Fu et al.
(Continued)

FOREIGN PATENT DOCUMENTS

| CN | 108537852 A | 9/2018 |
| CN | 111489401 A | 8/2020 |
| TW | 201931179 A | 8/2019 |

OTHER PUBLICATIONS

TW Office Action dated Sep. 15, 2022 in Taiwan application No. 110143129.

*Primary Examiner* — Jose L Couso
(74) *Attorney, Agent, or Firm* — McClure, Qualey & Rodack, LLP

(57) ABSTRACT

A contrastive learning method for color constancy employs a fully-supervised construction of contrastive pairs, driven by a novel data augmentation. The contrastive learning method includes receiving two training images, constructing positive and negative contrastive pairs by the novel data augmentation, extracting representations by a feature extraction function, and training a color constancy model by contrastive learning representations in the positive contrastive pair are closer than representations in the negative contrastive pair. The positive contrastive pair contains images having an identical illuminant while negative contrastive pair contains images having different illuminants. The contrastive learning method improves the performance without additional computational costs. The desired contrastive pairs allow the color constancy model to learn better illuminant feature that are particular robust to worse-cases in data sparse regions.

12 Claims, 5 Drawing Sheets

(51) Int. Cl.
*G06F 18/22* (2023.01)
*G06N 20/00* (2019.01)
*G06V 10/40* (2022.01)
*G06V 10/56* (2022.01)
*H04N 9/73* (2023.01)

(52) U.S. Cl.
CPC .............. *G06V 10/40* (2022.01); *G06V 10/56* (2022.01); *H04N 9/73* (2013.01); *G06T 2207/10152* (2013.01); *G06T 2207/20081* (2013.01); *G06T 2207/20084* (2013.01)

(58) Field of Classification Search
CPC .. G06N 3/02; G06N 3/08–088; G06N 3/0445; G06N 3/0454; G06N 3/4046; G06N 7/00; G06N 7/01; G06T 7/90; G06T 2207/10152; G06T 2207/20081; G06T 2207/20084; G06T 5/00; G06T 5/40; G06T 7/30; G06T 2207/10024; G06T 15/80; G06T 3/4046; G06T 5/60; G06T 9/002; G06T 2207/20076; G06V 10/40; G06V 10/56; G06V 10/7753; G06V 10/50; G06V 10/141; G06V 10/24; G06V 10/60; G06V 10/454; G06V 10/54; G06V 10/774; G06V 10/82; G06V 30/18057; H04N 9/73; H04N 1/6077; H04N 1/6086; H04N 23/88; H04N 23/10; G06K 7/1482; Y10S 128/925

See application file for complete search history.

(56) References Cited

U.S. PATENT DOCUMENTS

| | | | |
|---|---|---|---|
| 2003/0052978 A1* | 3/2003 | Kehtarnavaz | H04N 23/88 348/223.1 |
| 2011/0158527 A1* | 6/2011 | Wu | H04N 1/6077 382/167 |
| 2014/0267612 A1* | 9/2014 | El Dokor | H04N 23/88 348/46 |
| 2020/0051225 A1 | 2/2020 | Baarron et al. | |
| 2021/0006760 A1* | 1/2021 | McDonagh | G06N 3/045 |
| 2021/0058596 A1* | 2/2021 | Afifi | G06N 3/045 |
| 2022/0156899 A1* | 5/2022 | Abdelhamed | H04N 23/88 |

* cited by examiner

METHODS AND APPARATUSES OF CONTRASTIVE LEARNING FOR COLOR CONSTANCY

CROSS REFERENCE TO RELATED APPLICATIONS

The present invention claims priority to U.S. Provisional Patent Application Ser. No. 63/116,377, filed on Nov. 20, 2020, entitled "CLCC: Contrastive Learning for Color Constancy". The U.S. Provisional Patent Application is hereby incorporated by reference in its entirety.

FIELD OF THE INVENTION

The present invention relates to color constancy in image processing. In particular, the present invention relates to deep learning based methods for color constancy.

BACKGROUND AND RELATED ART

The human visual system is capable of perceiving the same canonical color of an object even under different illuminants. This feature is mimicked by computational color constancy, an essential task in the camera pipeline that processes raw sensor signals to sRGB images. Color constancy is a fundamental low-level computer vision task. Computational color constancy is also known as automatic White Balance (WB). Each raw image captured by camera sensors is represented by an image formation model and is processed by two color space conversions as described in the following. The first color space conversion maps a raw-RBG image to a standard perceptual color space image, which involves white balance and full color correction operations.

Image formation model A raw-RGB image can be viewed as a measurement of scene radiance within a particular range of spectrum from a camera sensor:

$$I_{raw}(x) = \int_w R_c(\lambda) S(x,\lambda) L(\lambda) d\lambda;$$

where denotes the wavelength, $w \in [380; 720]$ (nm) is the visible spectrum, $R_c$ is the spectral sensitivities of the sensor's color channel $c \in \{r,g,b\}$. The term $S(x, \lambda)$ denotes the scene's material reflectance at pixel x and $L(\lambda)$ is the illuminant in the scene, assumed to be spatially uniform. Notably, $I_{raw}$ values are linearly proportional to the scene radiance, making color constancy easier to work with.

Color space conversions Usually $I_{raw}$ undergoes two color space conversions in the camera pipeline:

$$I_{sRGB} = G_{XYZ \to sRGB}(F_{raw \to XYZ}(I_{raw}));$$

where $F(\cdot)$ involves linear operations including white balance and full color correction. $F(\cdot)$ maps a sensor-specific raw-RGB to a standard perceptual color space such as CIE XYZ. $G(\cdot)$ involves non-linear photo-finishing procedures such as contrast, hue, and saturation, and eventually maps XYZ to the sRGB color space.

White balance and full color correction Given $I_{raw}$, White Balance (WB) aims to estimate the scene illuminant $L=[L_r, L_g, L_b]$, i.e., the color of a neutral material captured with a physical color checker placed in a scene. Knowing that a neutral material equally reflects spectral energy at every wavelength regardless of different illuminants, a 3×3 diagonal matrix MWB with the diagonal entries $[L_g/L_r, 1, L_g/L_b]$ is applied on $I_{raw}$ to obtain a white-balanced image $I_{WB}$:

$$I_{WB} = I_{raw} M_{WB}.$$

After WB, a neutral material should appear achromatic (i.e., "gray"). Because WB only corrects achromatic colors, a 3×3 full color correction matrix $M_{CC}$ is further applied to correct chromatic colors. In practice, those chromatic patches with known CIE XYZ values are on color checker. Note that $M_{CC}$ is illuminant-specific due to error introduced by the estimated $M_{WB}$:

$$I_{XYZ} = I_{WB} M_{CC};$$

such $I_{XYZ}$ is sensor-agnostic since the illuminant cast is completely removed for both achromatic and chromatic colors.

In general, current research of color constancy can be divided into learning-free and learning-based approaches. The former ones use color histogram and spatial information to estimate illuminant. Conventional learning-free methods utilize statistical properties of the scene to cope with the ill-posed problem, such as the most widely used gray world assumption. Such statistical methods, however, often fail where their assumptions are violated in complex scenes. Despite the efficiency of these methods, learning-free based approaches do not perform well on challenging scenes with ambiguous color pixels. The learning-based approaches adopt data-driven approaches that learn to estimate illuminant from training data. These learning-based approaches outperform learning-free methods and have become popular in both academic and industry fields.

Until recently, deep learning based methods have been applied to the color constancy problem and achieve considerable quality improvements on challenging scenes. A deep learning based method called Fully Convolutional Color Constancy with Confidence-weighted Pooling (FC4) uses ImageNetpretrained backbones to prevent over-fitting and estimate illuminant with two additional convolutional layers. A deep learning based method RCC-Net uses a convolutional LSTM to extract features in both spatial and temporal domains to estimate illuminants. Another method C4 proposes a cascade, coarse-to-fine network for color constancy, stacking three SqueezeNets to improve model quality. To mitigate the issue that the learned representation suffers from being sensitive to image content, a deep learning based method IGTN introduces metric learning to learn scene-independent illuminant features. From a different perspective, most learning based methods strongly bind to a single sensor's spectral sensitivity and thus cannot be generalized to other camera sensors without fine-tuning.

Yet, this ill-posed and sensor-dependent task still suffers from the difficulty of collecting massive paired data for supervised training. When learning with insufficient training data, a common issue frequently encountered is the possibility of learning spurious correlations or undesirable biases from data: misleading features that work for most training samples but do not always hold in general. For instance, previous research has shown that a deep object-recognition model may rely on the spuriously correlated background instead of the foreground object to make predictions or be biased towards object textures instead of shapes. In the case of color constancy, outdoor scenes often have higher correlations with high color temperature illuminants than indoor scenes. Thus, deep learning models may focus on scene related features instead of illuminant related features. This leads to a decision behavior that tends to predict high color temperature illuminants for outdoor scenes, but suffers high error on outdoor scenes under low color temperature illuminants. This problem becomes worse when the sparsity of data increases.

BRIEF SUMMARY OF THE INVENTION

Embodiments of a contrastive learning method for color constancy in an image or video processing system comprise receiving input data associated with a first training image $I_{XA}$ captured in a first scene X under a first illuminant $L_A$ and input data associated with a second training image $I_{YB}$ captured in a second scene Y under a second illuminant $L_B$, constructing positive and negative contrastive pairs by applying a data augmentation to the first and second training images $I_{XA}$ and $I_{YB}$, extracting representations of the images in the positive and negative contrastive pairs by a feature extraction function, and training a color constancy model by contrastive learning. The positive contrastive pair contains two images having an identical illuminant and the negative contrastive pair contains two images having different illuminants. The representations in each positive contrastive pair are closer than the representations in each negative contrastive pair.

In some embodiment, the step of training a color constancy model by contrastive learning comprises mapping each representation to a projection in a latent projection space by a feature projection function, measuring a similarity between projections of the positive contrastive pair (z, $z^+$) and a similarity between projections of the negative contrastive pair (z, $z^{31}$), and maximizing the similarity between the projections of the positive contrastive pair (z, $z^+$) and minimizing the similarity between the projections of the negative contrastive pair (z, $z^-$) by a contrastive loss function.

The data augmentation is design to augment the training images to a different view. In some embodiments, a first augmented image $I^+_{XA}$ derived from the first training image $I_{XA}$ is label-preserving as the first training image $I_{XA}$ and the first augmented image $I^+_{XA}$ share a same ground-truth illuminant.

In some embodiments of constructing better contrastive pairs for contrastive learning, a novel illuminant $L_C$ is derived by interpolation or extrapolation between the first illuminant $L_A$ and the second illuminant $L_B$, augmented images are synthesized by the data augmentation, and the positive and negative contrastive pairs are constructed from the augmented images. A first augmented image $I^+_{XA}$ having the first scene and the first illuminant, a second augmented image $I^+_{YA}$ having the second scene and the first illuminant, a third augmented image $I^-_{XC}$ having the first scene and the novel illuminant, and a fourth augmented image $I^-_{YC}$ having the second scene and the novel illuminant are synthesized using the data augmentation. An easy positive contrastive pair is constructed by including the first training image $I_{XA}$ and the first augmented image $I^+_{XA}$, and an easy negative contrastive pair is constructed by including the first training image $I_{XA}$ and the fourth augmented image $I^-_{YC}$. A hard positive contrastive pair is constructed by including the first training image $I_{XA}$ and the second augmented image $I^+_{YA}$, and a hard negative contrastive pair is constructed by including the first training image $I_{XA}$ and the third augmented image $I^-_{XC}$. The data augmentation extracts canonical colors from the first and second training images $I_{XA}$ and $I_{YB}$ to form color checkers $C_A$ and $C_B$, fits a color mapping matrix $M_{AB}$ and an inverse color mapping matrix $M_{BA}$ to map between the two color checkers $C_A$ and $C_B$, and derive two additional color mapping matrices $M_{AC}$ and $M_{BC}$ from the color mapping matrix $M_{AB}$ and inverse color mapping matrix $M_{BA}$ for the novel illuminant $L_C$. The second augmented image $I^+_{YA}$ is synthesized by applying the color mapping matrix $M_{AB}$ to the second training image $I_{YB}$, and the third $I^-_{XC}$ and fourth $I^-_{YC}$ augmented images are synthesized by applying the two additional color mapping matrices $M_{AC}$ and $M_{BC}$ to the first and second training images $I_{XA}$ and $I_{YB}$. Some embodiment of the contrastive learning method further comprise mapping each representation to a projection in a latent projection space by a feature projection function, computing a first, second, third, and fourth losses for the representations, and computing a contrastive loss by a sum of the first, second, third, and fourth losses. The first loss is associated with the representations of the easy positive contrastive pair and easy negative contrastive pair, and the second loss is associated with the representations of the easy positive contrastive pair and hard negative contrastive pair. The third loss is associated with the representations of the hard positive contrastive pair and easy negative contrastive pair, and the fourth loss is associated with the representations of the hard positive contrastive pair and hard negative contrastive pair.

In one embodiment, the color mapping matrix $M_{AB}$ and inverse color mapping matrix $M_{BA}$ are full color transformation matrices and the two additional color mapping matrices MAC and $M_{BC}$ are full color transformation matrices. In another embodiment, the color mapping matrix $M_{AB}$ and inverse color mapping matrix $M_{BA}$ are reduced from full color transformation matrices to diagonal matrices, and the two additional color mapping matrices $M_{AC}$ and $M_{BC}$ are derived from an identity matrix, the color mapping matrix $M_{AB}$, and inverse color mapping matrix $M_{BA}$. The third $I^-_{XC}$ and fourth $I^-_{YC}$ augmented images are synthesized by simplified neutral color mapping using the two additional color mapping matrices $M_{AC}$ and $M_{BC}$.

In one embodiment, the step of constructing positive and negative contrastive pairs further comprises synthesizing a first augmented image $I^{+YA}$ having the second scene Y and the first illuminant $L_A$, and a second augmented image $I^-_{XB}$ having the first scene X and the second illuminant $L_B$ by the data augmentation. The positive contrastive pair is constructed by including the first training image $I_{XA}$ and the first augmented image $I^+_{YA}$, and the negative contrastive pair is constructed by including the first training image $I_{XA}$ and the second augmented image $I^-_{XB}$. The data augmentation extracts canonical colors from the first $I_{XA}$ and second $I_{YB}$ training images to form color checkers $C_A$ and $C_B$, fits a color mapping matrix $M_{AB}$ and an inverse color mapping matrix $M_{BA}$ to map between the two color checkers $C_A$ and $C_B$, and applied the color mapping matrix $M_{AB}$ and inverse color mapping matrix $M_{BA}$ to the first $I_{XA}$ and second $I_{YB}$ training images to synthesize the first $I^+_{YA}$ and second $I^-_{XB}$ augmented images.

Embodiments of the color constancy model are trained by scene-invariant and illuminant-dependent representations, so that representations of a same scene under different illuminant are far from each other while the representations of different scenes under a same illuminant are close to each other.

Aspects of the disclosure further provide an apparatus conducting contrastive learning for color constancy in an image or video processing system. The apparatus comprising one or more electronic circuits configured to receive input data of a first and second training images, construct positive and negative contrastive pairs by applying a data augmentation to the first and second training images, extract representations of the images in the positive and negative contrastive pairs by a feature extraction function, and train a color constancy model by contrastive learning. Each positive contrastive pair contains two images having an identical illuminant and each negative contrastive pair contains two images having different illuminants. The color constancy model is trained by learning representations in each positive contrastive pair are closer than the representations in each negative contrastive pair.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Figure 1:
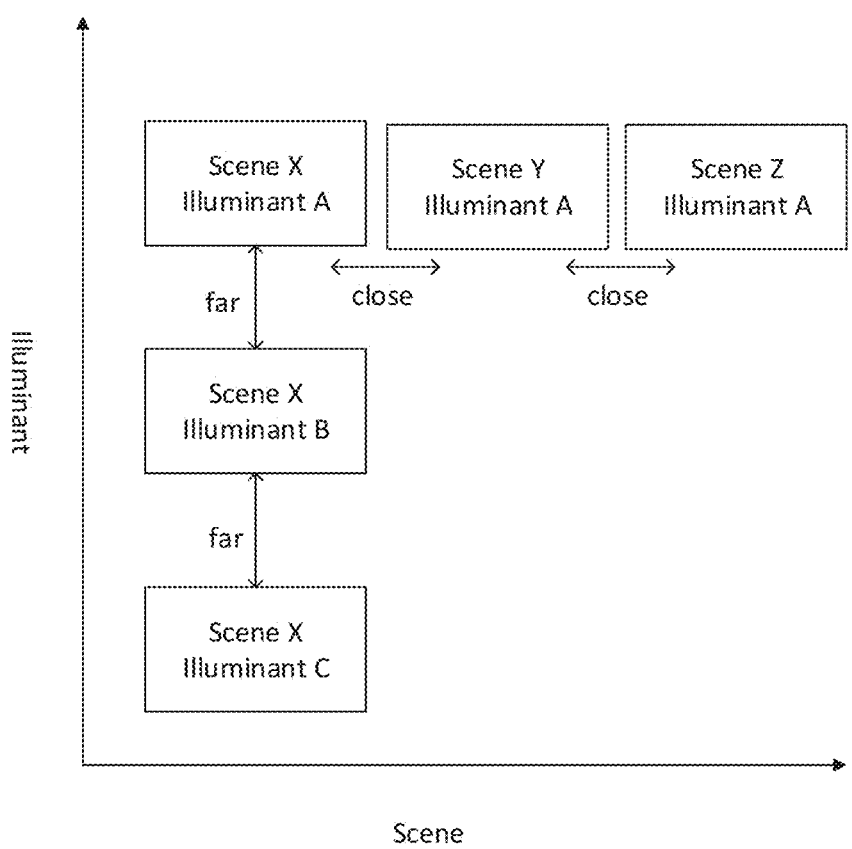
FIG. 1 illustrates a relationship of representations for scene-invariant and illuminant-dependent representations.

To avoid learning spurious correlations by deep learning models that focus on scene or object related features, contrastive learning may be used to regularize deep learning models to learn scene invariant and illuminant-dependent representations. Contrastive learning is a framework that learns general and robust feature representations by comparing similar and dissimilar pairs. Inspired from Noise Contrastive Estimation (NCE) and N-pair loss. As illustrated in FIG. 1, in contrast to image classification problems, the representations of the same scene under different illuminants for color constancy contrastive learning should be far from each other. On the contrary, the representations of different scenes under the same illuminant should be close to each other. However, conventional self-supervised contrastive learning often generates easy or trivial contrastive pairs that are not very useful for learning generalized feature representations.

A deep learning based method for color constancy is designed to learn desired representations by contrastive learning according to embodiments of the present invention. The desired representations are scene-invariant and illuminant-dependent representations so that the representations of the same scene under different illuminants are far from each other, while the representations of different scenes under the same illuminant are more close to each other. Contrastive pairs generated by self-supervised contrastive learning are usually not good enough for regularizing the deep learning models for color constancy. Embodiments of the present invention construct more useful contrastive pairs for color constancy contrastive learning by data augmentations. Data augmentations are found to be effective in contrastive pair construction for conducting successful contrastive learning, for example, data augmentations such as random cropping, flipping, and rotation have been widely used in classification, object detection, and semantic segmentation to improve model quality. Various works rely on manually designed augmentations to reach their best results. To ease such efforts, strategy search or data synthesis have been used to improve data quality and diversity. However, popular data augmentation strategies for image recognition and classification may not be suitable for the color constancy task. For example, most previous data augmentations in contrastive learning are designed for high-level vision tasks such as object recognition and seek illuminant invariant features, which can be detrimental for color constancy. Data augmentation such as color dropping converts an sRGB image to a gray-scale one, making the color constancy task even more difficult. Consequently, color domain knowledge is incorporated to design data augmentation suitable for contrastive learning on color constancy according to some embodiments of the present invention. The color constancy task works best in the linear color space where the linear relationship to scene radiance is preserved. This prevents from using non-linear color jittering augmentations such as contrast, saturation, and hue.

Figure 2:
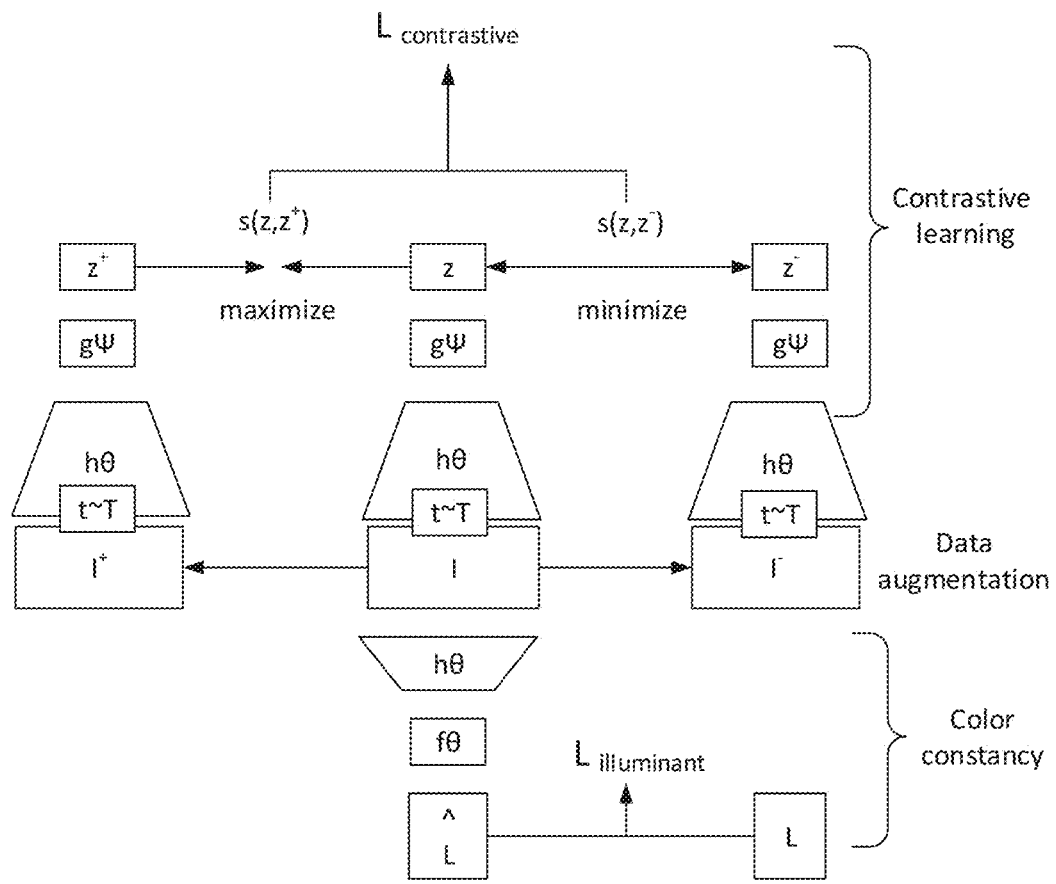
FIG. 2 illustrates a framework of a contrastive learning for color constancy system incorporating contrastive learning to learn generalized and illuminant-dependent feature representations according to an embodiment of the present invention.

Methodology-Formulation FIG. 2 illustrates an overview of the Contrastive Learning for Color Constancy (CLCC) method. Contrastive learning is incorporated in the main color constancy task to learn generalized and illuminant-dependent feature representations. The learning problem setting follows the majority of learning-based color constancy research which only focuses on the white balance step of estimating the illuminant $L$ from the input raw image $I_{raw}$:

$$\hat{L} = f_\phi(h_\phi(I_{raw}));$$

where $h_\phi$ is the feature extractor that produces visual representations for $I_{raw}$, $f_\phi$ is the illuminant estimation function, and $\hat{L}$ is the estimated illuminant. Both $h_\phi$ and $f_\phi$ are parameterized by deep neural network with arbitrary architecture design, where $\theta$ and $\phi$ can be trained via backpropagation.

The overall learning objective can be decomposed into two parts illuminant estimation for color constancy and contrastive learning for better representations as shown in FIG. 2.

$$\mathcal{L}_{total} = \lambda \ \mathcal{L}_{illuminant} + \beta \ \mathcal{L}_{contrastive};$$

For the illuminant estimation task, a commonly used angular error is used:

$$\mathcal{L}_{illuminant} = \arccos\left(\frac{\hat{L} \cdot L}{\|\hat{L}\| \cdot \|L\|}\right);$$

where $\hat{L}$ is the estimated illuminant and L is the ground-truth illuminant. Since the datasets for color constancy are relatively small because it is difficult to collect training data with corresponding ground-truth illuminants. Training a deep learning color constancy model with only the supervision $\mathcal{L}_{illuminant}$ usually does not generalize well. Contrastive learning is applied to train the color constancy model in various embodiment of the present invention that generalize better even with a small training dataset.

In some embodiments of the CLCC, fully-supervised contrastive learning is used for color constancy. The essential building blocks of contrastive learning as shown in FIG. 2 include a stochastic data augmentation $t(\bullet) \sim T$, a feature extraction function $h_{\varphi\varphi}$, a feature projection function $g_\psi$, a similarity metric function $s(\bullet)$, contrastive pair formulation, and a contrastive loss function $L_{contrastive}$. A stochastic data augmentation augments a sample image I to a different view $t(I)$. Note that $t(\bullet)$ is required to be label-preserving, meaning that I and $t(I)$ still share the same ground-truth illuminant L. The feature extraction function $h_\varphi$, extracts the representation of $t(I)$, and is further used for downstream color constancy task. The feature projection function maps the representation $h_\varphi(t(I))$ to the projection z that lies on a unit hypersphere. The feature projection function $g_\psi$ is typically only required when computing learning representations and is thrown away once the learning is finished. The similarity metric function measures the similarity between latent projections (zi, zj). Anchor I, positive $I^+$, and negative $I^-$ samples jointly compose the positive pair $(I, I^+)$ and the negative pair $(I, I^-)$ in contrastive pair formulation for contrastive learning. For the color constancy task, a positive pair should share the same illuminant label L, while a negative pair should have different ones. The contrastive loss function aims to maximize the similarity between the projections of the positive pair $(z, z^+)$ and minimize the similarity between that of the negative pair $(z, z^+)$ in the latent projection space.

In self-supervised contrastive learning, two random training images $I_i$ and $I_j$ with different scene content are given, a positive contrastive pair is form with two randomly augmented views of the same image $(t(I_i), t'(I_i^+))$, and a negative contrastive pair is formed with views of two different images $(t(I_i), t'(I_j^-))$. Such naive formulation introduces two potential drawbacks. One is the sampling bias, the potential to sample a false negative pair that shares very similar illuminants, for example, $L_i \approx L_j$. The other drawback is the lack of hardness, the fact that the positive $t(I_i^+)$ derived from the same image as the anchor $t(I_i)$ could share similar scene content. This alone suffices to let neural network easily distinguish from negative $t'(I_j^-)$ with apparently different scene content. To alleviate sampling bias and increase the hardness of contrastive pairs, methods of the present invention leverage label information, extending self-supervised contrastive learning into fully-supervised contrastive learning, where the essential data augmentation is specifically designed to be label-preserving for color constancy task.

Figure 3:
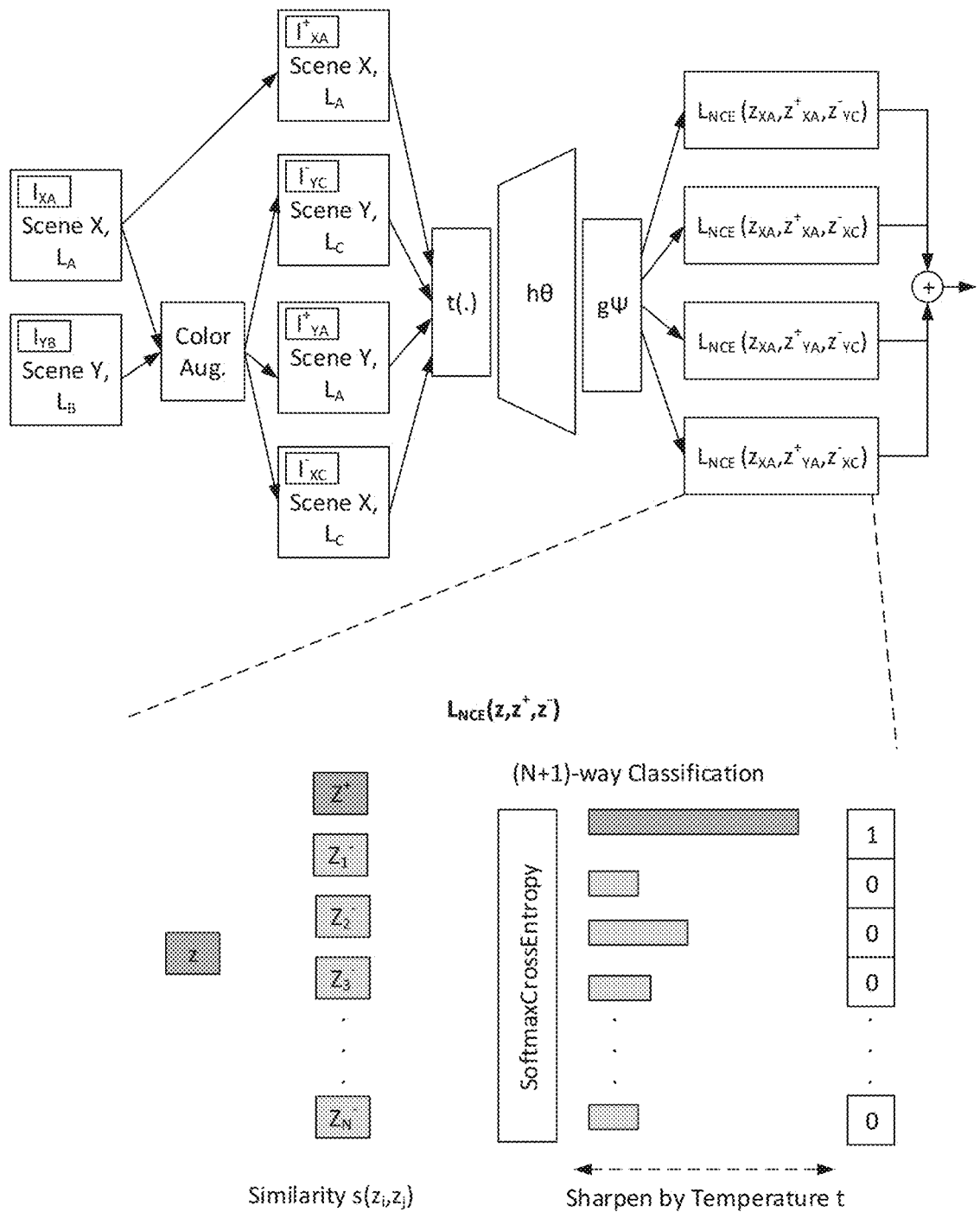
FIG. 3 illustrates an embodiment of formation for contrastive pairs and color augmentation.

Contrastive Learning for Color Constancy FIG. 3 illustrates the realization of each component in the fully-supervised contrastive learning framework according to an embodiment of the present invention. A first stage of contrastive learning is contrastive pair formulation from two randomly sampled training images $I_{XA}$ and $I_{YB}$, where $I_{XA}$ is defined as a linear raw-RGB image captured in the scene X under the illuminant $L_A$, and $I_{YB}$ is a linear raw-RGB image captured in the scene Y under the illuminant $L_B$. In various embodiments of the present invention, a positive pair shares an identical illuminant while a negative pair has different illuminants. Four contrastive pairs are generated from two randomly sampled training images $I_{XA}$ and $I_{YB}$ according to this embodiment. These four contrastive pairs include an easy positive pair $(t(I_{XA}), t'(I^+_{XA}))$, an easy negative pair $(t(I_{XA}), t'(I^-_{YC}))$, a hard positive pair $(t(I_{XA}), t'(I^+_{YA}))$, and a hard negative pair $(t(I_{XA}), t'(I^-_{XC}))$. The easy positive pair contains two images having an identical scene X and illuminant $L_A$, and the easy negative pair contains two images having different scenes (X, Y) and different illuminants $(L_A, L_C)$. The hard positive pair contains two images having different scenes (X, Y) but with an identical illuminant $L_A$, and the hard negative pair contains two images having an identical scene X but with different illuminants $(L_A, L_C)$.

Images $I_{YC}$, $I_{YA}$, and $I_{XC}$ are synthesized by replacing one scene's illuminant to another. A novel illuminant $L_C$ is derived by interpolation or extrapolation between the illuminants $L_A$ and $L_B$ of the two training images. A redundant hard negative sample $I_{XB}$ is not required in this embodiment. The function t is a stochastic perturbation-based, illuminant-preserving data augmentation composed by random intensity, random shot noise, and random Gaussian noise.

Next stages of contrastive learning are similarity metric and contrastive loss function. Once the contrastive pairs are defined in the image space, a feature extraction function $h_\varphi$ and a feature projection function $g_\psi$ are used to encode those views $t(\bullet)$ to the latent projection space z. The contrastive loss is computed as the sum of InfoNCE losses for properly elaborated contrastive pairs:

$$\mathcal{L}_{contrastive} = \mathcal{L}_{NCE}(Z_{XA}, Z^+_{XA}, Z^-_{YC}) + \mathcal{L}_{NCE}(Z_{XA}, Z^+_{XA}, Z^-_{XC}) + \mathcal{L}_{NCE}(Z_{XA}, Z^+_{YA}, Z^-_{YC}) + \mathcal{L}_{NCE}(Z_{XA}, Z^+_{YA}, Z^-_{XC}).$$

The InfoNCE loss $\mathcal{L}_{NCE}$ can be computed as:

$$\mathcal{L}_{NCE} = -\log\left[\frac{\exp\left(\frac{s^+}{\tau}\right)}{\exp\left(\frac{s^+}{\tau}\right) + \sum_{n=1}^{N}\exp\left(\frac{s^-}{\tau}\right)}\right];$$

where s+ and s− are the cosine similarity scores of positive and negative pairs respectively:

$$s^+ = s(z, z^{30}); s^- = s(z, z^-).$$

The InfoNCE loss could be viewed as performing a (N+1) way classification realized by cross-entropy loss with N negative pairs and 1 positive pair, where i is the temperature scaling factor.

Raw-domain Color Augmentation The goal of the proposed data augmentation is to synthesize more diverse and harder positive and negative samples for CLCC by manipulating illuminants such that the color constancy solution space is better constrained. Images $I_{YC}$, $I_{YA}$, and $I_{XC}$ are synthesized based on two randomly sampled images $(I_{XA}, L_A)$ and $(I_{YB}, L_B)$ by the following procedure. Twenty-four linear-raw RGB colors $C_A \in \mathbb{R}^{24 \times 3}$ and $C_B \in \mathbb{R}^{24 \times 3}$ of the color checker are extracted from $I_{XA}$ and $I_{YB}$ respectively using the off-the-shelf color checker detector. Given the detected color checkers $C_A$ and $C_B$, a linear color mapping matrix $M_{AB} \in \mathbb{R}^{3 \times 3}$ that transforms $C_A$ to $C_B$ can be solved by any standard least-square method. The inverse color mapping matrix $M_{BA}$ can be derived by solving $M_{AB}^{-1}$. Accordingly, images $I_{XB}$ and $I_{YA}$ can be augmented as:

$$I_{XB}=I_{XA}M_{AB}; I_{YA}=I_{YB}M_{BA}.$$

The above data augmentation procedure produces novel samples $I_{XB}$ and $I_{YA}$, but using only pre-existing illuminants $L_A$ and $L_B$ from the training images. To synthesize a novel sample $I_{XC}$ under a novel illuminant $L_C$ that does not exist in the training data set, a color checker $C_C$ can be synthesized by channel-wise interpolating or extrapolating from the existing color checkers $C_A$ and $C_B$ as:

$$C_C=(1-w)C_A+wC_B;$$

where w can be randomly sampled from a uniform distribution of an appropriate range $[w_{min}, w_{max}]$. For example, a new color checker is synthesized using w=0.5 for interpolation, or a new color checker is synthesized using w=−1.5 or 1.5 for extrapolation. Note that w should not be close to zero in avoidance of yielding a false negative sample $I_{XC}=I_{XA}$ for contrastive learning. To more realistically synthesize $I_{XC}$, that is more accurate on chromatic colors, a full color transformation matrix $M_{AC}$ is used to map $I_{XA}$ to $I_{XC}$, and a full color transformation matrix $M_{BC}$ is used to map $I_{YB}$ to $I_{YC}$:

$$I_{XC}=I_{XA}M_{AC}; I_{YC}=I_{YB}M_{BC}.$$

Figure 4:
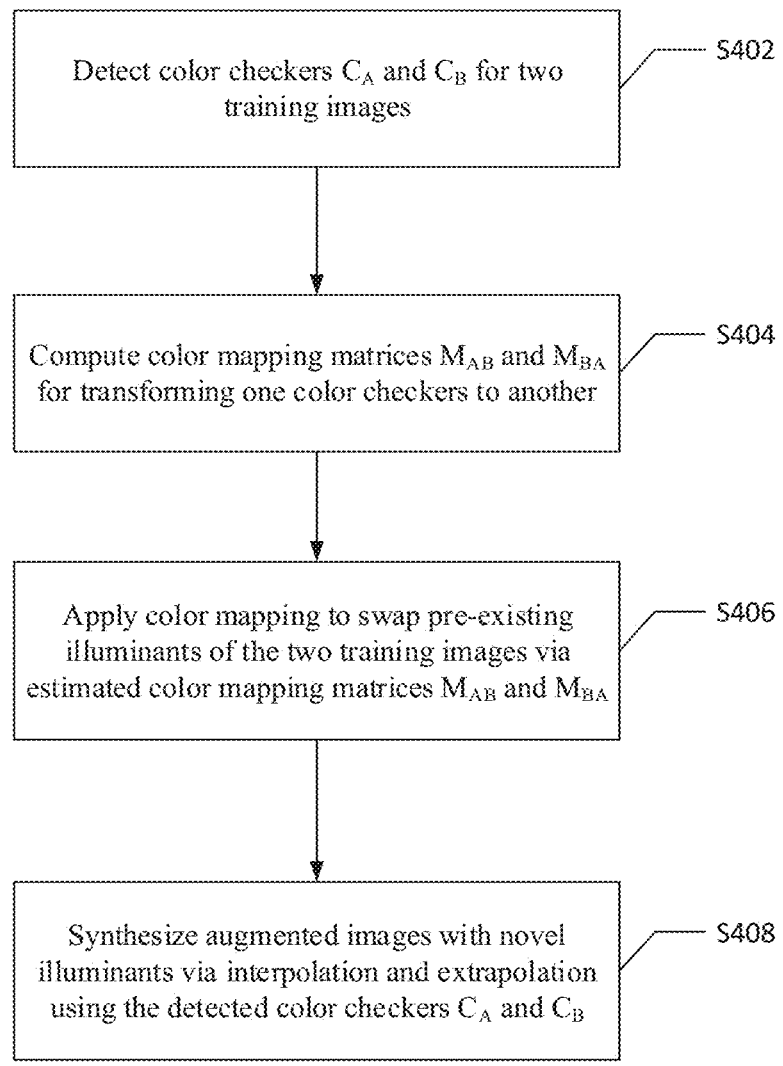
FIG. 4 is a flowchart illustrating applying a data augmentation to synthesize augmented images for better contrastive pair construction according to an embodiment of the present invention.

FIG. 4 is a flowchart illustrating an example of the data augmentation applied to the contrastive learning for color constancy according to an embodiment of the present invention. In step S402, color checkers $C_A$ and $C_B$ for a pair of training images $I_{XA}$ and $I_{YB}$ are detected. A color mapping matrix $M_{AB}$ is computed for transforming color checker $C_A$ to $C_B$ and an inverse color mapping matrix $M_{BA}$ is computed for transforming color checker $C_B$ to $C_A$ in step S404. The data augmentation applies color mapping to swap pre-existing illuminants of the two training images $I_{XA}$ and $I_{YB}$ via estimated color mapping matrices $M_{AB}$ and $M_{BA}$ in step S406. In step S408, augmented images $I_{XC}$ and $I_{YC}$ with a novel illuminant corresponding to a novel color checker $C_C$ are synthesize via interpolation and extrapolation using the detected color checkers $C_A$ and $C_B$.

In some embodiments, the color transformation matrix $M_{AC}$ can be efficiently computed from the identity matrix $\mathbb{I}$ and $M_{AB}$ without solving least-squares, and similarly, the color transformation matrix $M_{BC}$ can be efficiently computed from the identity matrix $\mathbb{I}$ and $M_{BA}$ without solving least-squares.

$$M_{AC}=(1-w)\mathbb{I}+wM_{AB}; M_{BC}=w\mathbb{I}+(1-w)M_{BA}.$$

The above synthesis method could be limited by the performance of color checker detection. When the color checker detection is not successful, the full colors $C_A$ and $C_B$ could be reduced to the neutral ones $LA$ and $LB$, meaning that the color transformation matrix $M_{AB}$ is reduced from a full matrix to a diagonal matrix. This is also equivalent to first perform WB on $I_A$ with $L_A$, and subsequently perform an inverse WB with $L_B$. Even when chromatic colors cannot be correctly mapped, contrastive learning for color constancy with simplified neutral color mapping could still obtain performance improvement over the baseline.

Evaluation Following the evaluation protocol, angular errors of applying various methods on the two public benchmark datasets NUS-8 and Gehler are evaluated. The Gehler dataset has 568 linear raw-RGB images captured by two cameras and the NUS-8 dataset has 1736 linear raw-RGB images captured by eight cameras. The performance of the CLCC method is able to achieve state-of-the-art mean angular error on the NUS-8 dataset, 17.5% improvements compared to FC4 with similar model size. Other competitive methods, such as C4 and IGTN, use much more model parameters (3 times and more than 200 times) but give worse mean angular error. The CLCC method provides significant improvements over the baseline network SqueezeNet-FC4 across all scoring metrics and reach the best mean metric, as well as the best wrose-25% metric. This indicates that the embodiment of fully-supervised contrastive learning not only improves the overall performance when there is no massive training data, but also improves robustness via effective contrastive pair constructions. For the Gehler dataset, the CLCC method stays competitive with less than 0.1 performance gap behind the best performing approach C4, whose model size is three times larger. Methods achieving better scores than the CLCC method either require substantially more complexity or utilize supplemental data. The C4 method has three times more parameters which may facilitate remembering more sensor features than the CLCC method. The FFCC method needs meta-data from camera to reach the best median metric. If no auxiliary data is used, the CLCC method performs better than FFCC-4 channels on all matrices. The CLCC method can also provide improvements on robustness for worst-cases. The improvement over worse-case performance increases especially in the region that suffers from data sparsity. This supports the aim of the contrastive learning design which learn better illuminant-dependent features that are robust and invariant to scene contents.

Figure 5:
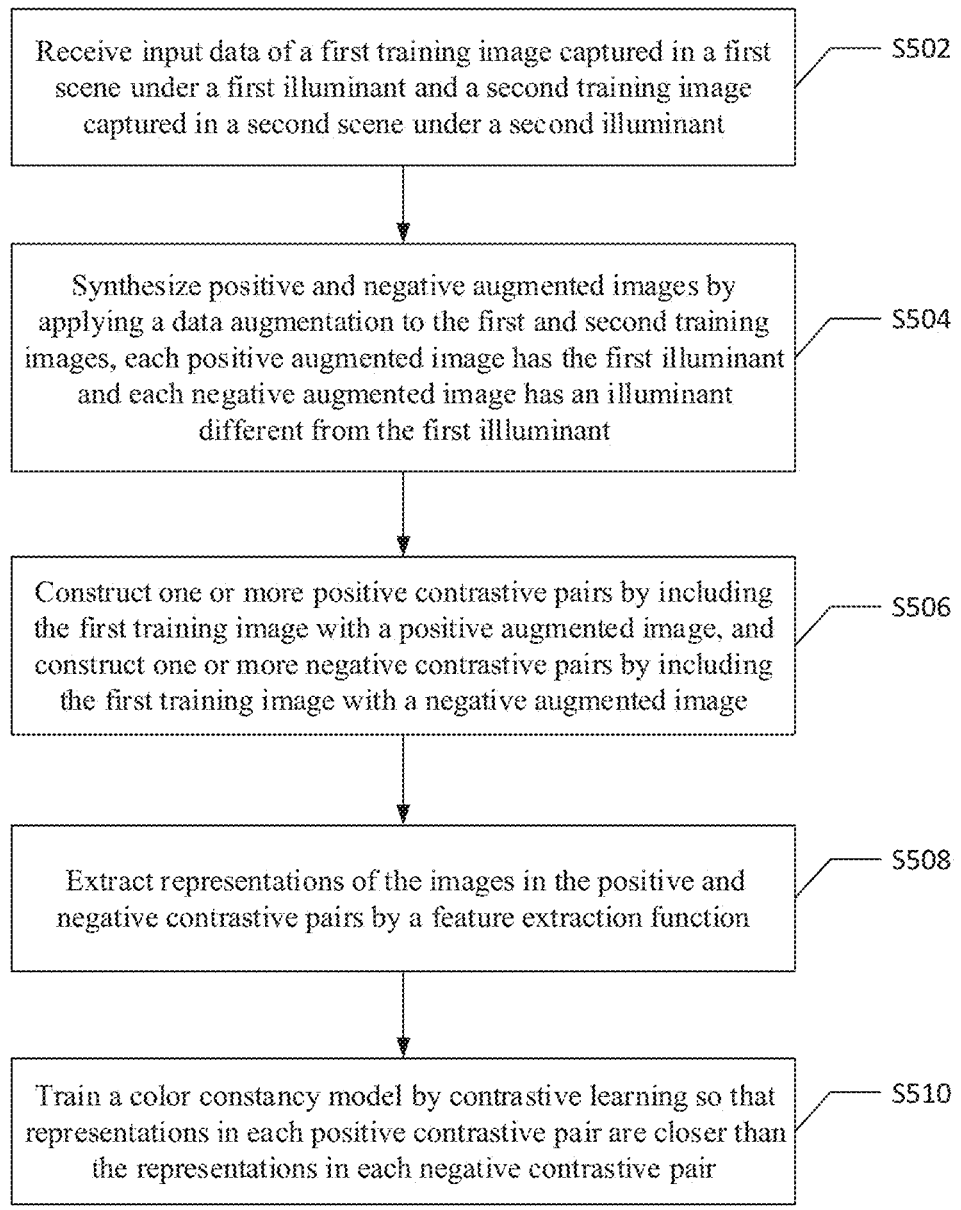
FIG. 5 is a flowchart of contrastive learning for color constancy according to an embodiment of the present invention.

Representative Flowchart for an Embodiment of Present Invention FIG. 5 is a flowchart illustrating embodiments of a contrastive learning method for color constancy in an image or video processing system. The image or video processing system receives input data of a first training image captured in a first scene under a first illuminant and a second training image captured in a second scene under a second illuminant in step S502. A data augmentation is applied to the first and second training images to synthesize positive and negative augmented images in step S504. Each positive augmented image has the first illuminant and each negative augmented image has an illuminant different from the first illuminant. The image or video processing system constructs one or more positive contrastive pairs and one or more negative contrastive pairs in step S506. Each positive contrastive pair includes the first training image and a positive augmented image and each negative contrastive pair includes the first training image and a negative augmented image. A feature extraction function is used to extract representations of the images in the positive and negative contrastive pairs in step S508. The image or video processing system trains a color constancy model by contrastive learning in step S510. The color constancy model is trained to learn representations in the positive contrastive pair are closer than the representations in the negative contrastive pair.

Embodiments of contrastive learning for color constancy may be implemented in a circuit integrated into a video compression chip or program code integrated into video compression software to perform the processing described above. For examples, synthesis of positive and negative contrastive pairs may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that define the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A contrastive learning method for color constancy in an image or video processing system, comprising:
    receiving input data associated with a first training image captured in a first scene under a first illuminant, and a second training image captured in a second scene under a second illuminant;
    constructing at least a positive contrastive pair and at least a negative contrastive pair by applying a data augmentation to the first and second training images, wherein each positive contrastive pair contains two images having an identical illuminant and each negative contrastive pair contains two images having different illuminants;
    extracting representations of the images in the positive and negative contrastive pairs by a feature extraction function; and
    training a color constancy model by contrastive learning, wherein the color constancy model is trained by learning representations in each positive contrastive pair are closer than the representations in each negative contrastive pair.

2. The method of claim 1, wherein the step of training a color constancy model by contrastive learning further comprises:
    mapping each representation to a projection in a latent projection space by a feature projection function;
    measuring a similarity between projections of the positive contrastive pair and a similarity between projections of the negative contrastive pair; and
    maximizing the similarity between the projections of the positive pair and minimizing the similarity between the projections of the negative pair by a contrastive loss function.

3. The method of claim 1, wherein the data augmentation augments the first training image to a different view to derive a first augmented image, wherein the first augmented image is label-preserving as the first training image and the first augmented image share a same ground-truth illuminant.

4. The method of claim 1, wherein the step of constructing positive and negative contrastive pairs further comprises:
    deriving a novel illuminant by interpolation or extrapolation between the first illuminant and the second illuminant;
    synthesizing a first augmented image having the first scene and the first illuminant, a second augmented image having the second scene and the first illuminant, a third augmented image having the first scene and the novel illuminant, and a fourth augmented image having the second scene and the novel illuminant by the data augmentation; and
    constructing an easy positive contrastive pair by including the first training image and the first augmented image, constructing an easy negative contrastive pair by including the first training image and the fourth augmented image, constructing a hard positive contrastive pair by including the first training image and the second augmented image, and constructing a hard negative contrastive pair by including the first training image and the third augmented image.

5. The method of claim 4, wherein the data augmentation extracts canonical colors from the first and second training images to form color checkers, fits a color mapping matrix and an inverse color mapping matrix to map between the two color checkers, derives two additional color mapping matrices from the color mapping matrix and inverse color mapping matrix for the novel illuminant, applies the color mapping matrix to the second training image to synthesize the second augmented image, and applies the two additional color mapping matrices to the first and second training images to synthesize the third and fourth augmented images respectively.

6. The method of claim 5, wherein the color mapping matrix and inverse color mapping matrix are full color transformation matrices and the two additional color mapping matrices are full color transformation matrices.

7. The method of claim 5, wherein the color mapping matrix and inverse color mapping matrix are reduced from full color transformation matrices to diagonal matrices, and the two additional color mapping matrices are derived from an identity matrix, the color mapping matrix, and inverse color mapping matrix, wherein the third and fourth augmented images are synthesized by simplified neutral color mapping using the two additional color mapping matrices.

8. The method of claim 4, further comprising:
    mapping each representation to a projection in a latent projection space by a feature projection function;
    computing a first loss for the representations of the easy positive contrastive pair and easy negative contrastive pair, a second loss for the representations of the easy positive contrastive pair and hard negative contrastive pair, a third loss for the representations of the hard positive contrastive pair and easy negative contrastive pair, and a fourth loss for the representations of the hard positive contrastive pair and hard negative contrastive pair; and
    computing a contrastive loss by a sum of the first, second, third and fourth losses.

9. The method of claim 1, wherein the step of constructing positive and negative contrastive pairs further comprises:
    synthesizing a first augmented image having the second scene and the first illuminant and a second augmented image having the first scene and the second illuminant by the data augmentation;
    constructing the positive contrastive pair by including the first training image and the first augmented image and constructing the negative contrastive pair by including the first training image and the second augmented image.

10. The method of claim 9, wherein the data augmentation extracts canonical colors from the first and second training images to form color checkers, fits a color mapping matrix and an inverse color mapping matrix to map between the two color checkers, and applies the color mapping matrix and the inverse color mapping matrix to the first and second training images to synthesize the first and second augmented images.

11. The method of claim 1, wherein the color constancy model is trained by scene-invariant and illuminant-dependent representations, so that representations of a same scene under different illuminants are far from each other and representations of different scenes under a same illuminant are close to each other.

12. An apparatus conducting contrastive learning for color constancy in an image or video processing system, the apparatus comprising one or more electronic circuits configured for:
- receiving input data associated with a first training image captured in a first scene under a first illuminant, and a second training image captured in a second scene under a second illuminant;
- constructing at least a positive contrastive pair and at least a negative contrastive pair by applying a data augmentation to the first and second training images, wherein each positive contrastive pair contains two images having an identical illuminant and each negative contrastive pair contains two images having different illuminants;
- extracting representations of the images in the positive and negative contrastive pairs by a feature extraction function; and
- training a color constancy model by contrastive learning, wherein the color constancy model is trained by learning representations in each positive contrastive pair are closer than the representations in each negative contrastive pair.

* * * * *